(12) United States Patent
Moravy et al.

(10) Patent No.: US 12,470,661 B2
(45) Date of Patent: *Nov. 11, 2025

(54) SYSTEMS AND METHODS FOR INTEGRATED CONFERENCING PLATFORM

(71) Applicant: Shure Acquisition Holdings, Inc., Niles, IL (US)

(72) Inventors: Leif Josef Moravy, Chicago, IL (US); Mathew T. Abraham, Colorado Springs, CO (US); Paul Gunia, Chicago, IL (US); John Casey Gibbs, Chicago, IL (US); Lucas Brant Farran, Lake Zurich, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,388

(22) Filed: Mar. 21, 2024

(65) Prior Publication Data
US 2024/0428817 A1    Dec. 26, 2024

Related U.S. Application Data

(63) Continuation of application No. 17/654,539, filed on Mar. 11, 2022, now Pat. No. 11,967,333, which is a (Continued)

(51) Int. Cl.
*G10L 21/0232* (2013.01)
*G06F 3/16* (2006.01)
(Continued)

(52) U.S. Cl.
CPC ............ *H04M 9/082* (2013.01); *G06F 3/165* (2013.01); *G06F 21/602* (2013.01); (Continued)

(58) Field of Classification Search
CPC ....... G10L 21/0232; G10L 2021/02082; G06F 3/165; G06F 21/602; H04M 9/082;
(Continued)

(56) References Cited

U.S. PATENT DOCUMENTS 6,266,408 B1    7/2001  Park
8,069,206 B2   11/2011  McDonald, Jr.
(Continued)

FOREIGN PATENT DOCUMENTS

EP    2569939    *  3/2013  .............. H04N 7/14
WO   2011143434    11/2011

OTHER PUBLICATIONS

International Search Report and Written Opinion for PCT/US2019/034224 dated Sep. 16, 2019, 10 pp.

*Primary Examiner* — Xu Mei
(74) *Attorney, Agent, or Firm* — ALSTON & BIRD LLP

(57) ABSTRACT

A software-based conferencing platform is provided. The platform comprises a plurality of audio sources providing input audio signals, the audio sources including a virtual audio device driver configured to receive far-end input audio signals from a conferencing software module, and a network audio library configured to receive near-end input audio signals from one or more near-end audio devices. The platform further comprises a digital signal processing component configured to receive the input audio signals from the audio sources and generate audio output signals based the received signals, the digital signal processing component comprising an acoustic echo cancellation module configured to apply acoustic echo cancellation techniques to one or more of the near-end input audio signals.

20 Claims, 4 Drawing Sheets

Related U.S. Application Data continuation of application No. 16/424,349, filed on May 28, 2019, now Pat. No. 11,276,417.

(60) Provisional application No. 62/685,689, filed on Jun. 15, 2018.

(51) Int. Cl.
    *G06F 21/60*     (2013.01)
    *G10L 21/0208*     (2013.01)
    *H04L 7/00*     (2006.01)
    *H04L 12/26*     (2006.01)
    *H04M 9/08*     (2006.01)
    *H04R 1/40*     (2006.01)
    *H04R 3/00*     (2006.01)
    *H04R 3/12*     (2006.01)

(52) U.S. Cl.
    CPC ........ *G10L 21/0232* (2013.01); *H04L 7/0008* (2013.01); *H04R 1/403* (2013.01); *H04R 1/406* (2013.01); *H04R 3/005* (2013.01); *H04R 3/12* (2013.01); *G10L 2021/02082* (2013.01)

(58) Field of Classification Search
    CPC .......... H04N 7/15; H04N 7/152; H04N 7/155; H04N 7/157; H04B 3/20
    USPC ............................... 381/66; 348/14.08, 14.09
    See application file for complete search history.

(56) References Cited

U.S. PATENT DOCUMENTS

| | | |
|---|---|---|
| 8,150,052 B2 | 4/2012 | Gygax |
| 8,437,282 B2 | 5/2013 | Toren |
| 8,441,515 B2 | 5/2013 | Yam |
| 9,008,302 B2 | 4/2015 | Thapa et al. |
| 9,357,171 B2 | 5/2016 | Toren |
| 9,628,206 B2 | 4/2017 | Perkins |
| 9,723,263 B2 | 8/2017 | Lee |
| 9,749,072 B2 | 8/2017 | Perkins |
| 9,781,386 B2 | 10/2017 | Ben Natan |
| 9,935,915 B2 | 4/2018 | Manley |
| 10,154,148 B1 | 12/2018 | Chu et al. |
| 10,901,809 B2 * | 1/2021 | Rosenboom ........ G06F 9/45533 |
| 11,245,787 B2 * | 2/2022 | Kim ........................ H04B 3/20 |
| 11,276,417 B2 * | 3/2022 | Moravy ................ G06F 21/602 |
| 11,474,882 B2 | 10/2022 | Rosenboom |
| 11,561,813 B2 | 1/2023 | Rosenboom |
| 11,804,237 B2 * | 10/2023 | Tu ....................... G10L 21/0208 |
| 11,967,333 B2 * | 4/2024 | Moravy ................... G06F 3/165 |
| 2010/0272251 A1 | 10/2010 | Banba et al. |
| 2011/0099485 A1 * | 4/2011 | Alcorn ................ H04R 27/00 |
| | | 715/753 |
| 2014/0139615 A1 | 5/2014 | Graham |
| 2014/0148934 A1 | 5/2014 | Manley |
| 2015/0288735 A1 | 10/2015 | Krishnamoorthy |

* cited by examiner

SYSTEMS AND METHODS FOR INTEGRATED CONFERENCING PLATFORM

CROSS-REFERENCE

This application is a continuation of U.S. patent application Ser. No. 17/654,539, filed on Mar. 11, 2022, which is a continuation of U.S. patent application Ser. No. 16/424,349, now U.S. Pat. No. 11,276,417, filed on May 28, 2019, which claims priority to U.S. Provisional Application No. 62/685,689, filed on Jun. 15, 2018. These applications are fully incorporated herein by reference.

TECHNICAL FIELD

This application generally relates to conferencing systems and methods and more specifically, to a conferencing software platform configured to operate using existing in-room hardware.

BACKGROUND

Conferencing environments, such as conference rooms, boardrooms, video conferencing settings, and the like, typically involve the use of a discrete conferencing device comprising one or more microphones for capturing sound from various audio sources active in such environments. The audio sources may include in-room human speakers, and in some cases, loudspeakers playing audio received from human speakers that are not in the room, for example. The captured sound may be disseminated to a local audience in the environment through amplified speakers (for sound reinforcement), and/or to others remote from the environment (such as, e.g., a via a telecast and/or webcast) using communication hardware included in or connected to the conferencing device. The conferencing device may also include one or more speakers or audio reproduction devices for playing out loud audio signals received, via the communication hardware, from the human speakers that are remote from the conferencing environment. Other hardware included in a typical conferencing device may include, for example, one or more processors, a memory, input/output ports, and user interface/controls.

Conferencing devices are available in a variety of sizes, form factors, mounting options, and wiring options to suit the needs of particular environments. The type of conferencing device and its placement in a particular conferencing environment may depend on the locations of the audio sources, physical space requirements, aesthetics, room layout, and/or other considerations. For example, in some environments, the conferencing device may be placed on a table or lectern to be near the audio sources. In other environments, the microphones for a given conference device may be mounted overhead to capture the sound from the entire room, for example.

The distributed audio signals produced in such environments are typically aggregated to a single audio signal processing device, computer, or server. In such cases, a digital signal processor (DSP) may be included in the conferencing environment to process the audio signals using, for example, automatic mixing, matrix mixing, delay, compressor, and parametric equalizer (PEQ) functionalities. Further explanation and exemplary embodiments of the functionalities of existing DSP hardware may be found in the manual for the P300 Intellimix Audio Conferencing Processor from SHURE, which is incorporated by reference in its entirety herein. The P300 manual includes algorithms optimized for audio/video conferencing applications and for providing a high quality audio experience, including eight channels of acoustic echo cancellation, noise reduction and automatic gain control.

One drawback of using a hardware device to provide DSP functionalities is the restriction on scalability and adaptability. For example, a hardware DSP includes a specific set of audio inputs, such as analog inputs and USB inputs. If the user outgrows these hardware-based limitations at a later date, a new or additional DSP may have to be purchased and configured for use in the conferencing environment, regardless of whether the user needs all of the functionality (e.g., number of channels, etc.) provided by the new device. This can be costly and time consuming. Another drawback is the reliance on a physical piece of hardware, which may be susceptible to burn-out, failure, malfunction, etc., as will be appreciated.

Given these device-specific limitations, there is still a need for a distributed conferencing system that is flexible and not limited to a single piece of hardware.

SUMMARY

The invention is intended to solve the above-noted and other problems by providing a software-based conferencing solution that utilizes pre-existing in-room hardware (e.g., microphones and loudspeakers) and a generic computing device to implement the solution.

Embodiments include a software-based conferencing platform comprising a plurality of audio sources providing input audio signals, the audio sources including a virtual audio device driver configured to receive far-end input audio signals from a conferencing software module, and a network audio library configured to receive near-end input audio signals from one or more near-end audio devices. The platform further comprises a digital signal processing component configured to receive the input audio signals from the audio sources and generate audio output signals based the received signals, the digital signal processing component comprising an acoustic echo cancellation module configured to apply acoustic echo cancellation techniques to one or more of the near-end input audio signals.

Another exemplary embodiment includes a computer-implemented method of audio processing for a conferencing environment. The method comprises receiving input audio signals at a plurality of audio sources, wherein the receiving comprises receiving far-end input audio signals at a virtual audio device driver from a conferencing software module, and receiving near-end input audio signals at a network audio library from one or more near-end audio devices. The method further comprises processing the input audio signals using a digital signal processing component, the processing comprising: applying acoustic echo cancellation techniques to one or more of the near-end input audio signals, and generating audio output signals based on the input audio signals.

Yet another exemplary embodiment includes a conferencing system comprising one or more processors; at least one memory; one or more near-end audio devices configured to capture near-end audio signals; and one or more programs stored in the at least one memory and configured to be executed by the one or more processors. The one or more programs comprise a conferencing software module configured to receive far-end audio signals from at least one remote server; a virtual audio device driver configured to receive the far-end audio signals from the conferencing software module; a network audio library configured to receive the near-end audio signals from the one or more near-end audio devices; and a digital signal processing component configured to receive the near-end audio signals from the network audio library, receive the far-end audio signals from the virtual audio device driver, and generate audio output signals based on the received signals, wherein the digital signal processing component comprises an acoustic echo cancellation module configured to apply acoustic echo cancellation techniques to one or more of the near-end audio signals.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
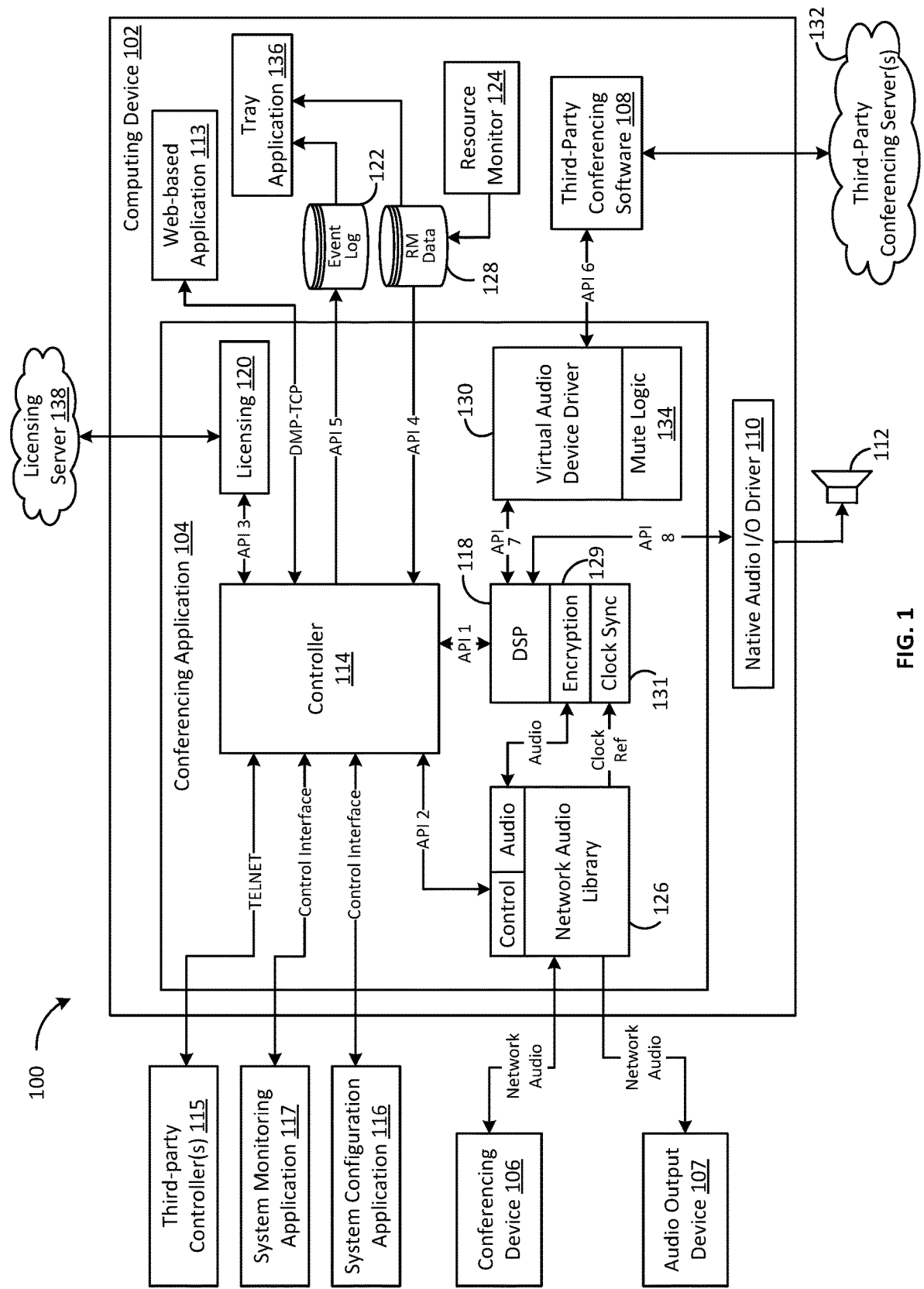
FIG. 1 is a block diagram illustrating an exemplary conferencing system in accordance with one or more embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Systems and methods are provided herein for a software-based approach to audio processing in conferencing environments, referred to herein as a "software-based conferencing platform" comprising a specifically-tailored "conferencing application." The conferencing application delivers a software solution for digital signal processing ("DSP") that runs on a small computing platform (e.g., Intel NUC, Mac Mini, Logitech Smartdock, Lenovo ThinkSmart Hub, etc.) for servicing a single room, or multiple rooms, of microphones and loudspeakers. In embodiments, the software solution can take the form of a fixed DSP path. The conferencing application is designed to reuse existing computing resources in the conferencing environment or room. For example, the computing resources can be either a dedicated resource, meaning its only intended use and purpose is for conference audio processing, or a shared resource, meaning it is also used for other in-room services, such as, e.g., a soft codec platform or document sharing. In either case, placing the software solution on a pre-existing computing resource lowers the overall cost and complexity of the conferencing platform. The computing device can support network audio transport, USB, or other analog or digital audio inputs and outputs and thereby, allows the computing device (e.g., PC) to behave like DSP hardware and interface with audio devices and a hardware codec. The conferencing platform also has the ability to connect as a virtual audio device driver to third-party soft codecs (e.g., third-party conferencing software) running on the computing device. In a preferred embodiment, the conferencing application utilizes C++ computer programming language to enable cross-platform development.

The conferencing application may be flexible enough to accommodate very diverse deployment scenarios, from the most basic configuration where all software architecture components reside on a single laptop/desktop, to becoming part of a larger client/server installation and being monitored and controlled by, for example, proprietary conferencing software or third-party controllers. In some embodiments, the conferencing application product may include server-side enterprise applications that support different users (e.g., clients) with different functionality sets. Remote status and error monitoring, as well as authentication of access to control, monitoring, and configuration settings, can also be provided by the conferencing application. Supported deployment platforms may include, for example, Windows 8 and 10, MAC OS X, etc.

The conferencing application can run as a standalone component and be fully configurable to meet a user's needs via a user interface associated with the product. In some cases, the conferencing application may be licensed and sold as an independent conferencing product. In other cases, the conferencing application may be provided as part of a suite of independently deployable, modular services in which each service runs a unique process and communicates through a well-defined, lightweight mechanism to serve a single purpose.

FIG. 1 illustrates an exemplary conferencing system 100 for implementing the software-based conferencing platform, in accordance with embodiments. The system 100 may be utilized in a conferencing environment, such as, for example, a conference room, a boardroom, or other meeting room where the audio source includes one or more human speakers. Other sounds may be present in the environment which may be undesirable, such as noise from ventilation, other persons, audio/visual equipment, electronic devices, etc. In a typical situation, the audio sources may be seated in chairs at a table, although other configurations and placements of the audio sources are contemplated and possible, including, for example, audio sources that move about the room. One or more microphones may be placed on a table, lectern, desktop, etc. in order to detect and capture sound from the audio sources, such as speech spoken by human speakers. One or more loudspeakers may be placed on a table, desktop, ceiling, wall, etc. to play audio signals received from audio sources that are not present in the room.

Figure 4:
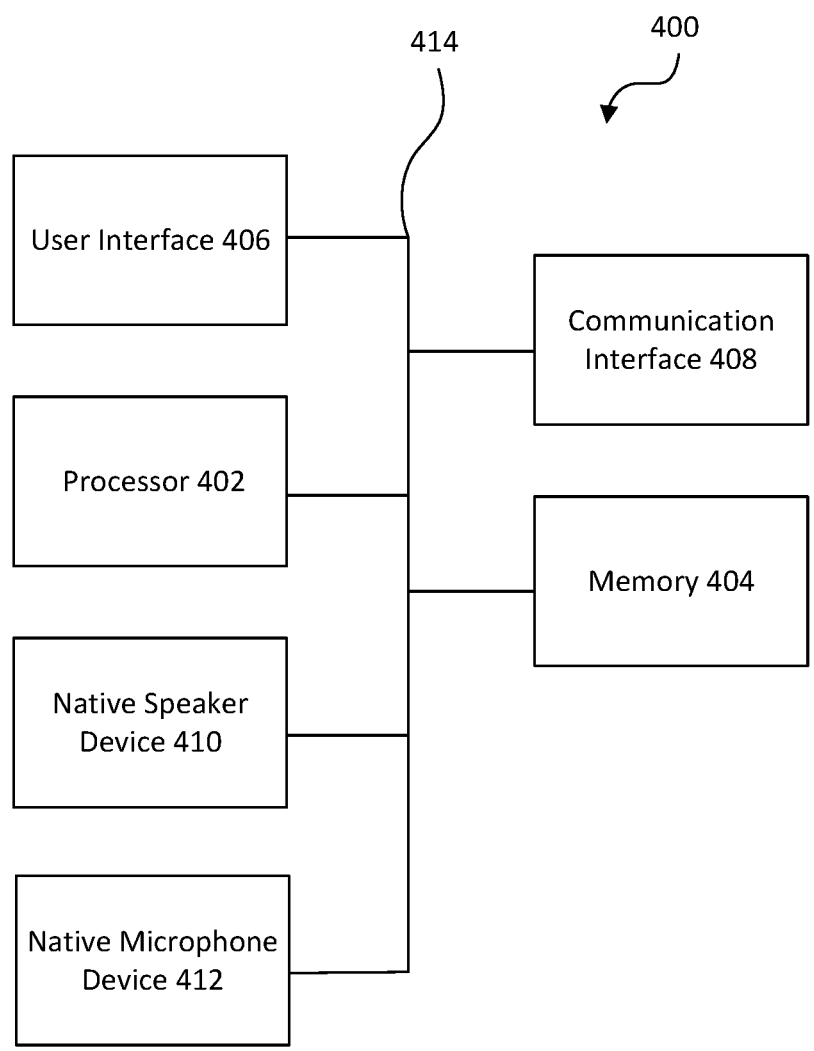
FIG. 4 is a block diagram illustrating an exemplary computing device of the conferencing system of FIG. 1, in accordance with embodiments.

The conferencing system 100 may be implemented using a computing device 102, such as, e.g., a personal computer (PC), a laptop, a tablet, a mobile device, a smart device, thin client, or other computing platform. In some embodiments, the computing device 102 can be physically located in and/or dedicated to the conferencing environment (or room). In other embodiments, the computing device 102 can be part of a network or distributed in a cloud-based environment. In some embodiments, the computing device 102 resides in an external network, such as a cloud computing network. In some embodiments, the computing device 102 may be implemented with firmware or completely software-based as part of a network, which may be accessed or otherwise communicated with via another device, including other computing devices, such as, e.g., desktops, laptops, mobile devices, tablets, smart devices, etc. In the illustrated embodiment, the computing device 102 can be any generic computing device comprising a processor and a memory device, for example, as shown in FIG. 4. The computing device 102 may include other components commonly found in a PC or laptop computer, such as, e.g., a data storage device, a native or built-in audio microphone device and a native audio speaker device.

The conferencing system 100 further includes a conferencing application 104 configured to operate on the computing device 102 and provide, for example, audio compression software, auto-mixing, DSP plug-in, resource monitoring, licensing access, and various audio and/or control interfaces. The conferencing application 104 may leverage components or resources that already exist in the computing device 102 to provide a software-based product. The conferencing application 104 may be stored in a memory of the computing device 102 and/or may be stored on a remote server (e.g., on premises or as part of a cloud computing network) and accessed by the computing device 102 via a network connection. In one exemplary embodiment, the conferencing application 104 may be configured as a distributed cloud-based software with one or more portions of the conferencing application 104 residing in the computing device 102 and one or more other portions residing in a cloud computing network. In some embodiments, the conferencing application 104 resides in an external network, such as a cloud computing network. In some embodiments, access to the conferencing application 104 may be via a web-portal architecture, or otherwise provided as Software as a Service (SaaS).

The conferencing system 106 further includes one or more conferencing devices 106 coupled to the computing device 102 via a cable or other connection means (e.g., wireless). Conferencing device 106 may be any type of audio hardware that comprises microphones and/or speakers for facilitating a conference call, webcast, telecast, etc., such as, e.g., SHURE MXA310, MX690, MXA910, etc. For example, the conferencing device 106 may include one or more microphones for capturing near-end audio signals produced by conference participants situated in the conferencing environment (e.g., seated around a conference table). The conferencing device 106 may also include one or more speakers for broadcasting far-end audio signals received from conference participants situated remotely but connected to the conference through third-party conferencing software or other far-end audio source. In some embodiments, the conferencing system 100 can also include one or more audio output devices 107, separate from the conferencing device 106. Audio output device 107 may be any type of loudspeaker or speaker system and may be located in the conferencing environment for audibly outputting an audio signal associated with the conference call, webcast, telecast, etc. In embodiments, the conferencing device(s) 106 and the audio output device(s) 107 can be placed in any suitable location of the conferencing environment or room (e.g., on a table, lectern, desktop, ceiling, wall, etc.). In some embodiments, the conferencing device 106 and audio output device 107 are network audio devices coupled to the computing device 102 via a network cable (e.g., Ethernet) and configured to handle digital audio signals. In other embodiments, these devices may be analog audio devices or another type of digital audio device.

As shown in FIG. 1, the conferencing application 104 includes various software-based interfaces for interfacing or communicating with one or more external components, such as, e.g., that of the computing device 102 or the larger conferencing system 100, and/or one or more internal components, such as, e.g., components within the conferencing application 104 itself. For example, the conferencing application 104 may include a plurality of audio interfaces, including audio interfaces to external hardware devices coupled to the computing device 102, such as, e.g., conferencing device 106, audio output device 107, and/or other microphones and/or speakers included in the conferencing system 100; audio interfaces to software executed by the computing device 102, such as, e.g., internal conferencing software and/or third-party conferencing software 108 (e.g., Microsoft Skype, Bluejeans, Cisco WebEx, GoToMeeting, Zoom, Join.me, etc.); and audio interfaces to device drivers for audio hardware included in the computing device 102, such as, e.g., native audio input/output (I/O) driver 110 for built-in microphone(s) and/or speaker(s). The conferencing application 104 may also include a plurality of control interfaces, including control interfaces to one or more user interfaces (e.g., web browser-based application 113 or other thin component user interface (CUI)); control interfaces to an internal controller application (e.g., controller 114); control interfaces to one or more third-party controllers (e.g., third-party controller 115); and control interfaces to one or more external controller applications (e.g., system configuration application 116, system monitoring application 117, etc.). The interfaces can be implemented using different protocols, such as, e.g., Application Programming Interface (API), Windows Audio Session API (WASAPI), Audio Stream Input/Output (ASIO), Windows Driver Model (WDM), Architecture for Control Networks (ACN), AES67, Transmission Control Protocol (TCP), Telnet, ASCII, Device Management Protocol TCP (DMP-TCP), Websocket, and more.

As also shown in FIG. 1, the conferencing application 104 comprises controller component or module 114, a digital signal processing (DSP) component or module 118, a licensing component or module 120, a network audio library 126 (e.g., Voice-over-IP (VOIP) library or the like), and a virtual audio device driver 130. The controller component 114 can be configured for managing other internal components or modules of the conferencing application 104 and for interfacing to external controllers, devices, and databases, thus providing all or some of the interfacing features of the conferencing application 104. For example, the controller 114 can serve or interface with an event log database 122 and a resource monitoring database 128 residing in, or accessible via, the computing device 102. The controller 114 can also serve or interface with a component graphical user interface (GUI or CUI), such as, e.g., web browser-based application 113, and any existing or proprietary conferencing software. In addition, the controller 114 can support one or more third-party controllers 115 and in-room control panels (e.g., volume control, mute, etc.) for controlling microphones or conferencing devices in the conferencing environment. The controller 114 can also be configured to start/stop DSP processing, configure DSP parameters, configure audio parameters (e.g., which devices to open, what audio parameters to use, etc.), monitor DSP status updates, and configure the DSP channel count to accord to a relevant license. Further, the controller 114 can manage soundcard settings and internal/external audio routing, system wide configurations (e.g., security, startup, discovery option, software update, etc.), persistent storage, and preset/template usage. The controller 114 can also communicate with external hardware (logic) in the conferencing environment (e.g., the multiple microphones and/or speakers in the room) and can control other devices on the network. The controller 114 can further support a monitor and logging component of the conferencing system 100, such as system monitoring application 117, and an automatic configuration component of the conferencing system 100, such as system configuration application 116.

In embodiments, the controller 114 can be configured to perform various control and communication functions through the use of an application programming interface (API) specific to each function, or other type of interface. For example, as shown in FIG. 1, a first API transceives control data between the controller 114 and the DSP component 118, a second API transceives control data between the controller 114 and a control component of the network audio library 126, and a third API transceives control data between the controller 114 and the licensing component 120. Also, a fourth API receives control data from the resource monitoring database 128 and a fifth API sends control data to the event log database 122.

Figure 2:
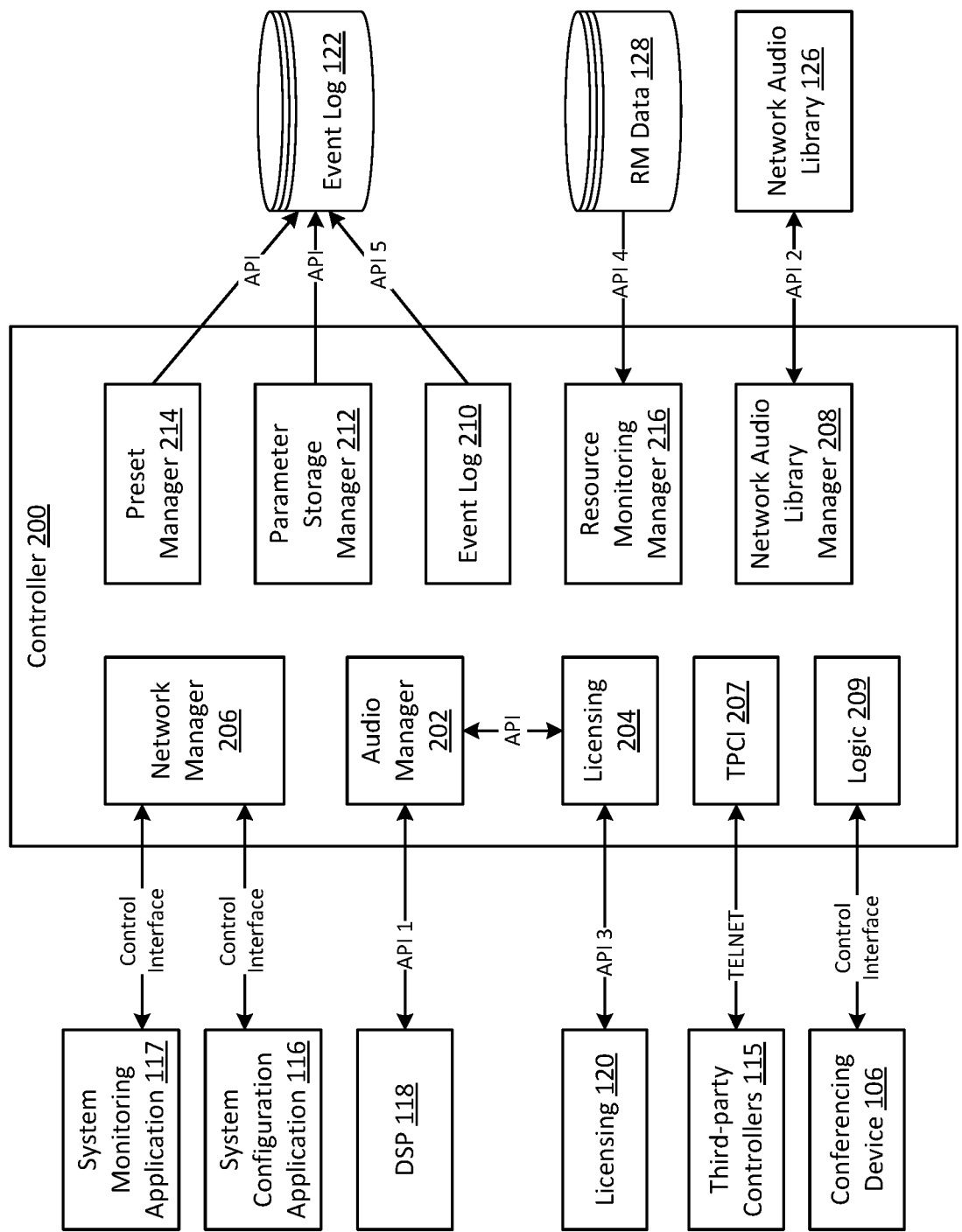
FIG. 2 is a block diagram illustrating an exemplary controller component of the conferencing system of FIG. 1 in accordance with one or more embodiments.

FIG. 2 illustrates an exemplary controller 200 that may be included in the conferencing system 100, for example, as the controller component 114, in accordance with embodiments. Various components of the controller 200 may be implemented in hardware (e.g., discrete logic circuits, application specific integrated circuits (ASIC), programmable gate arrays (PGA), field programmable gate arrays (FPGA), etc.) or software (e.g., program modules comprising software instructions executable by a processor). In a preferred embodiment, the controller 200 may be a software component or program module included in the conferencing application 104.

The controller 200 includes an audio manager 202 that interfaces to the DSP component 118 for configuration and status update (e.g., via the first API shown in FIG. 1), including setting up the DSP 118 and managing the DSP 118 and other audio settings. The audio manager 202 also interfaces with a licensing manager 204 of the controller 200 to ensure that license parameters are adhered to, via another API. The licensing manager 204, in turn, interfaces with licensing component 120 to obtain the appropriate licensing information (e.g., via the third API shown in FIG. 1).

The controller 200 further includes a network manager 206 that supports one or more network control interfaces, such as, e.g., ACN, for device discovery and control by proprietary controllers, such as system configuration application 116, system monitoring application 117. As shown, the controller 200 also includes a TPCI component or module 207 that supports one or more third-party control interfaces (TPCI), such as, e.g., Telnet or other TCP socket server port, for sending and receiving data to third-party controllers 115, for example, using an ASCII string protocol. In addition, the controller 200 includes a network audio library manager 208 that utilizes one or more network audio transport protocol interfaces (e.g., the second API in FIG. 1), such as, e.g., AES67, to update and monitor the network audio library 126.

In addition, the controller 200 includes a logic component or module 209 that supports a control interface for transmitting and receiving control data with the conferencing device 106. In embodiments, the logic component 209 may be configured to receive a logic mute request from an external device, such as, e.g., the conferencing device 106, or another audio device coupled to the network audio library 126. The logic mute request indicates to the controller 200 that the external device wishes to be removed from a gating decision performed by the DSP component 118 during automixing (e.g., as performed by automixer 304 of FIG. 3). In response, the automixer may mute the channel(s) corresponding to the external device, and the controller 200 may send a mute status back to the external device. In some embodiments, the logic mute request may be received at the controller 200 via the network audio library 126, for example, using the second API shown in FIG. 1. In other embodiments, the conferencing device 106 may directly interface with the controller 200, as shown in FIG. 2.

In embodiments, the controller 200 can interface with the event log database 122 to manage persistence storage of settings, presets, templates, and logs. To that end, the controller 200 can include an event log manager 210 that supports functionality to manage and maintain user-facing events, which allows the end user to identify and fix problems via tray application 136. In some cases, the event log manager 210 can be configured for logging of all system events, warnings, and errors together, and for managing event log storage on the event log database 122. The controller 200 can also include a parameter storage manager 212 and a preset manager 214, which can be an existing component of the computing device 102 that is responsible for presets management. Each of these components 210, 212, and 214 may interface with the event log database 122 via respective API (e.g., including the fifth API shown in FIG. 1), as shown in FIG. 2.

The controller 200 can also include a resource monitoring manager 216 configured for monitoring the conferencing application performance and overall health of the computing device 102, and configuring performance settings as needed. As shown, the resource monitoring manager 216 interfaces with resource monitoring database 128 via an API (e.g., the fourth API shown in FIG. 1). In some embodiments, the resource monitoring manager 216 may be configured to monitor latency, packet loss, and other quality control parameters, raise alerts when an issue is detected, and reconfigure settings to correct the issue.

In some embodiments, the controller 200 may also include a user interface security component (not shown) that is responsible for authentication of a component user interface (CUI), such as, e.g., web-based application 113 shown in FIG. 1. In some cases, the controller 200 can also include a virtual audio device driver (VADD) manager (not shown) that handles all communications with the virtual audio device driver 130, via the DSP 118, and sets configurations and monitors behavior of the same.

Referring back to FIG. 1, the DSP component or module 118 can be a software component of the conferencing application 104 that is configured to handle all audio signal processing. Any number of DSP functions may be implemented using the DSP component 118, including, without limitation, and by way of example, any of the functionality described in the manual for the P300 Intellimix Audio Conferencing Processor from SHURE, which is incorporated by reference in its entirety herein. In addition, the DSP component 118 handles DSP parameter messages from the controller 114, sends status information to the controller 114 (e.g., metering, errors, etc.), and opens and maintains connections with all audio devices.

In embodiments, the DSP component 118 may receive an encrypted audio signal from the network audio library 126. For example, the conferencing device 106 may be configured to encrypt the audio signals captured by its one or more microphones (e.g., using AES256 encryption algorithm or the like) prior to transmitting the signals over the network. As shown in FIG. 1, the DSP component 118 can include an encryption component or module 129 configured to run a decryption algorithm (see, e.g., decryption module 321 in FIG. 3) on the received audio signals (e.g., network audio signals) prior to providing the signals for DSP processing. Likewise, the encryption component 129 can be configured to run a corresponding encryption algorithm (see, e.g., encryption module 320 in FIG. 3) on processed audio signals prior to transmitting the signals to the network audio library 126.

As shown in FIG. 1, the DSP component 118 also includes a clock synchronization component or module 131 that is configured to synchronize audio signals across the conferencing system 100. For example, in embodiments, each of the virtual audio device driver 130, the network audio library 126, and the native audio I/O driver 110 may operate on a separate clock. In cases where the native audio I/O driver 110 supports both a native microphone and a native speaker, each of those native devices may operate on individual clocks as well. The clock synch component 131 can be configured to synchronize the clocks across the network to a single clock, such as, e.g., the clock of the network audio library 126 or other selected audio device. The selected clock may send a clock reference signal to the clock sync component 131 for synchronization purposes, as shown in FIG. 1.

In embodiments, the network audio library 126 can be a software component or module included in the conferencing application 104 for enabling communication between external audio hardware and the conferencing application 104. For example, as shown in FIG. 1, audio signals may be transmitted and/or received between the network audio library 126 and one or more conferencing device(s) 106 and/or audio output device(s) 107 that are external to the computing device 102 and coupled to the computing device 102 via Ethernet cables or other network connection. An audio stream (e.g., ASIO, WASAPI, CoreAudio, other API, etc.) may be created between the network audio library 126 and the DSP component 118 to process incoming audio signals from the conferencing device 106 and provide outgoing audio signals back to the conferencing device 106 and/or audio output device 107. In embodiments, the network audio library 126 may convert the audio signals received from the external conferencing device 106 to an audio format that is usable by the DSP 118, and vice versa. While the illustrated embodiment shows the network audio library 126 as being included in the conferencing application 104, in other embodiments, the network audio library 126 may be included in the computing device 102 as a stand-alone component, separate from the conferencing application 104.

Figure 3:
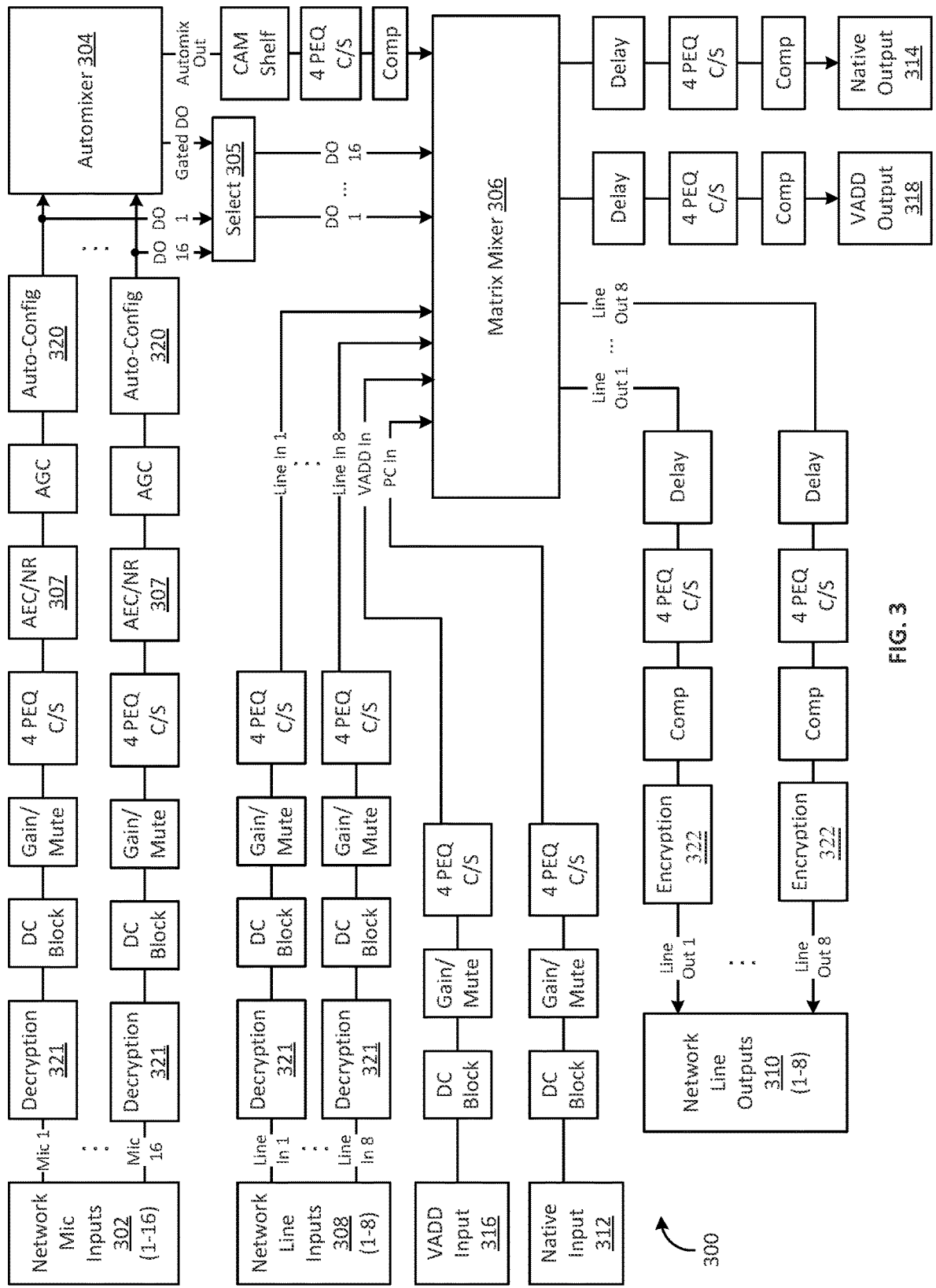
FIG. 3 is a block diagram illustrating an exemplary process for a digital signal processor (DSP) component of the conferencing system of FIG. 1, in accordance with one or more embodiments.

FIG. 3 illustrates an exemplary process 300 comprising operations of the DSP component 118 included in the conferencing application 104, in accordance with embodiments. The DSP component 118 performs all signal processing for the conferencing application 104 and can be implemented as a library that is linked in with the conferencing application 104. In some embodiments, the DSP component 118 can run as a stand-alone process.

As shown, the process 300 includes automixing, decryption/encryption, gain/mute, acoustic echo cancellation/noise reduction ("AEC/NR"), automatic gain control ("AGC"), compression ("Comp"), parametric equalization ("4 PEQ C/S"), matrix mixing, and other audio processing functions involving audio signals received from hardware and/or software components. In embodiments, the exact number of channels (or lobes) may be scalable, depending on the licensing terms purchased by the user. In the illustrated embodiment, the DSP 118 has at least one channel, scalable to sixteen channels, for receiving individual microphone inputs 302 from, for example, one or more conferencing devices 106 or separate microphones located in the conferencing environment 100. As shown in FIG. 3, each channel may undergo individual processing before being coupled to an automixer 304 (or automixing module) of the DSP 118.

The automixer 304 may be configured to combine all of the microphone inputs 302 into an automix output signal that is transmitted over an automix channel. In some embodiments, the automixer 304 may be configured to operate as a gated automixer, as shown in FIG. 3. In such cases, the automixer 304 has a second output channel for providing a gated direct out (DO) to an input selection component or module 305 of the DSP 118. The individually processed microphone inputs 302 are also provided to the input selection component 305 over respective direct out (DO) channels. The input selection component 305 may be configured to selectively open or close one or more of the DO channels based on the gated direct out signal received from the automixer 304.

For example, a selected channel may serve as a reference input (not shown) for an acoustic echo canceller 307 (or AEC module) of the DSP 118. In embodiments, the acoustic echo canceller 307 may reduce or eliminate an echo in the input signal(s) based on the selected reference channel, or a reference signal received there through. Further details on how the AEC module 307 operates to reduce or eliminate an echo and/or noise may be found in, for example, the manual for the P300 Intellimix Audio Conferencing Processor from SHURE, which is incorporated by reference in its entirety herein.

As shown in FIG. 3, the automix output is further processed before being provided to a matrix mixer 306 (or matrix mixing module) of the DSP 118, along with the selected direct outs from the selection component 305. The matrix mixer 306 can be configured to combine the automix output and the selected direct outs with inputs received from various other audio devices in the conferencing system 100, and produce appropriate mixed audio output signals for each individual audio device (or audio source). In some cases, the matrix mixer 306 can be configured to generate a mixed audio signal for a given audio device that excludes its own input signals and includes a mix of the input signals received from all other audio devices in the network. For example, input signals received from microphone 1 and line input 1 will not be included in the mixed audio output signal generated for line out 1, etc. Other matrix mixes or combinations of the input audio signals are also contemplated. In some cases, the matrix mixer 306 may generate a unique mixed output signal for each audio device or output channel. In other cases, the matrix mixer 306 may provide the same mixed output signal to two or more audio devices or output channels. In some embodiments, the matrix mixer 306 may generate mixed output signals based on the direct mic inputs 302, without connecting to the automixer 304.

While the process 300 shown in FIG. 3 includes only a specific set of operations, any number of DSP functions may be implemented, including, without limitation, and by way of example, any of the functionality described in the attached manual for the P300 Intellimix Audio Conferencing Processor from SHURE.

As shown, the DSP component 118 can interface with at least three different types of audio devices and can produce separate outputs for each device. The first type includes networked audio devices connected to the conferencing application 104 via the network audio library 126, and communicatively coupled to the computing device 102 through an Ethernet network or the like. The networked audio devices can include near-end audio hardware devices, such as, for example, conferencing device 106, audio output device 107, and/or a separate media player (e.g., CD player, DVD player, MP3 player, etc.). In some embodiments, the networked audio devices can include far-end audio hardware devices (not shown) configured to send far-end audio signals to the network audio library 126 using an Internet connection, such as, for example, a conferencing camera (e.g., Cisco Webex Board, etc.) located at the far-end of the conferencing environment.

As shown in FIG. 3, in addition to the mic inputs 302, the DSP 118 has up to eight channels for receiving network line inputs 308 from the networked audio devices and up to eight channels for transmitting network line outputs 310 to the corresponding networked audio devices. For example, in some embodiments, each networked near-end audio device may be coupled to, or transmit over, up to four of the network mic inputs 302 and up to four of the network line inputs 308, and may be coupled to, or receive over, up to four of the network line outputs 310. In such cases, the matrix mixer 306 may generate a first mixed output signal for each network line output 310 belonging to the same audio device by excluding or minimizing the mic input signals and line input signals received from the same audio device and including all other mic input signals and line input signals, as well as the input signals received from the other types of audio devices (e.g., native input 312 and VADD input 316).

The second type of audio device interfacing with the DSP 118 includes the built-in or local audio devices that are native to the computing device 102 (e.g., a PC headphone out jack (not shown), one or more native speakers, a USB mic (not shown), one or more native microphones, HDMI audio, etc.). These native devices are located at the near-end of the conferencing environment. As shown in FIG. 3, the DSP 118 includes a native input 312 for receiving audio signals captured by the native audio device(s) (e.g., a native microphone) and a native output 314 for providing a mixed audio output signal to the native audio device(s) (e.g., a native speaker). In embodiments, the mixed audio signal may be broadcast to near-end conferencing participants using loudspeaker 112, which may be an in-room speaker coupled to the computing device 102, as shown in FIG. 1. The content of the mixed audio output signal generated by the matrix mixer 306 and provided to native output 314 may include the audio signals received via the network mic inputs 302, network line inputs 308, and a VADD input 316, but not the audio signals received via the native input 312.

Referring back to FIG. 1, the native audio devices interface with the computing device 102 through the native audio I/O driver 110 or other computer program for operating and controlling the built-in audio device(s). As shown in FIG. 1, the native audio I/O driver 110 interfaces with the DSP component 118 via an eighth API. In embodiments, the conferencing application 104 may use any native OS audio interface, such as, e.g., WDM or WASAPI for Windows, or CoreAudio for Mac, to send and/or receive audio data between the DSP 118 and the native audio I/O driver 110.

The third type of audio device interfacing with the DSP 118 is the virtual audio device driver (VADD) 130. The VADD 130 connects to third-party conferencing software 108 (also referred to as "conferencing software module"), such as, e.g., Skype, Bluejeans, Zoom, etc., in order to receive far-end audio signals associated with a given conference call or meeting. In some embodiments, the conferencing software module 108 can include enterprise, proprietary, and/or internal conferencing software, as well as, or instead of, third-party conferencing software or soft codecs. As shown in FIG. 3, the DSP 118 includes a VADD input 316 for receiving far-end audio signals from the third-party conferencing software 108 via the virtual audio device driver 130, and a VADD output 318 for transmitting a mixed audio output signal back to the far-end participants via the third-party conferencing software 108 and the virtual audio device driver 130. As an example, the far-end audio signals may be microphone signals captured by a conferencing device, mobile phone, camera, laptop, desktop computer, tablet, or other audio hardware device that is situated adjacent to the far-end participants and is configured to communicatively connect to a third-party conferencing server 132 associated with the third-party conferencing software 108. The mixed audio output signal may be broadcast to the far-end participants via the same audio hardware device or a separate loudspeaker or other audio device. The mixed audio output signal generated by the matrix mixer 306 and provided to the VADD output 318 may include the audio signals received at mic inputs 302, line inputs 308, and native input 312, but not the audio signals received at VADD input 316. The conferencing application 104 may use an API to transceive audio data between the DSP 118 and the VADD 130 (e.g., the seventh API shown in FIG. 1).

In the illustrated embodiment, the conferencing system 100 comprises at least three different types of audio devices (or audio sources): network audio devices, VADD, and native audio devices. In other embodiments, the DSP component 118 may operate with less than all three audio device types. For example, the DSP 118 may interface with only the network audio library 126, or just the native audio I/O driver 110 and the virtual audio device driver 130. Also, the DSP component 118 can be configured to seamlessly handle interruptions in service from the network audio library 126 and the native audio device(s).

According to embodiments, the DSP parameter messages communicated between the controller 200 and the DSP component 118 include parameters (e.g., EQ frequencies, gains, mutes, etc.) from the controller 200 to the DSP component 118 and reports (e.g., real-time metering, warnings, etc.) from the DSP component 118 to the controller 200. Other communications include directing the DSP component 118 to open a specific Windows audio device, and managing a VOIP call. The DSP component 118 can also furnish audio diagnostic information to the controller 200.

Referring back to FIG. 1, the virtual audio device driver 130 is a software component or module included in the conferencing application 104 for enabling communication between the conferencing application 104 and other audio applications running on the computing device 102. For example, in FIG. 1, the virtual audio device driver 130 is configured to receive an audio stream from one or more third-party conferencing software 108, such as, e.g., Skype, Bluejeans, Zoom, or other software codec in communication with one or more third-party conferencing servers 132, and convert the received audio to an audio signal that is compatible with or used by the DSP 118. The virtual audio device driver 130 may be configured to perform the reverse conversion when audio is transmitted from the DSP 118 to the third-party conferencing software 108. In some embodiments, the virtual audio device driver 130 is also configured to send audio to, or receive audio from, cloud voice services, such as, e.g., AMAZON's Alexa or OK GOOGLE, either through a proxy application running on the same hardware or streaming directly to the cloud.

As shown in FIG. 1, a sixth API transceives audio data between the virtual audio device driver 130 and the third-party conferencing software 108, and a seventh API transceives audio data between the virtual audio device driver 130 and the DSP component 118. The virtual audio device driver 130 can interface with the third-party conferencing software 108, such as, e.g., Skype, Bluejeans, etc., via a native OS audio interface, such as, e.g., WDM or WASAPI for Windows, or CoreAudio for Mac.

The virtual audio device driver 130 may operate like any other audio device driver, for example, by providing a software interface that enables operating systems and/or other computer programs (e.g., the conferencing application 104 and/or the computing device 102) to access audio-related functions of an underlying audio device, except that the underlying "device" is not a hardware device. Rather, the underlying audio device is a virtual device comprised of software, namely third-party conferencing software 108 or other software codecs, and the virtual audio device driver 130 serves as a software interface for enabling the DSP 118 to control, access, and operate the third-party software 108. In embodiments, the virtual audio device driver 130 can be configured to enable the conferencing application 104, or the virtual audio device driver 130, to present itself as a standard Windows audio device to the computing device 102 (e.g., as an echo-cancelling speakerphone), making it easily selectable as a single input/output device from an audio settings menu of the third-party conferencing software 108. For example, the virtual audio device driver 130 may be a kernel-mode audio device driver that is used by the conferencing application 104 as an audio interface with the computing device 102. Meanwhile, the conferencing application 104 may be configured to transmit and/or receive processed audio from the audio devices directly connected to the application 104, such as, e.g., conferencing device 106 and audio output device 107.

In some embodiments, the virtual audio device driver 130 can be configured to enable mute control through the third-party conferencing software 108, for example, by adding a control channel dedicated to mute control, volume, and other control data, instead of directly turning off the far-end microphone itself, as is conventional. For example, a mute logic component or module 134 of the virtual audio device driver 130 may be configured to receive a mute (or unmute) status from the third-party conferencing software 108 via the dedicated channel and provide the mute status to the DSP component 118. The DSP component 118 may convey the mute status across the system 100, or to all audio sources within the system 100, to synchronize the mute status with related indicators at each audio source, including software (e.g., GUI) and/or hardware (e.g., microphone LEDs) indicators. In other embodiments, this mute logic may be communicated over a ninth API (not shown) that allows the controller 114 to directly interface with the third-party conferencing software.

As shown in FIG. 1, the conferencing system 100 further includes system configuration application 116 and system monitoring application 117, which are designed to interact with the conferencing application 104 via a network control protocol interface, such as, e.g., ACN. The conferencing system 100 may also include device network authentication (a.k.a. "Network Lock") to prevent unintended and/or accidental changes to network devices over the control protocol. This feature can be implemented in the conferencing application 104 and can be used by the system configuration application 116 to lock, or prevent alterations to, the conferencing application 104.

In embodiments, the system configuration application 116 comprises configuration and design software for controlling the design, layout, and configuration of the audio network, including, for example, routing audio inputs and outputs, setting up audio channels, determining the type of audio processing to use, etc., and deploying relevant settings across the conferencing system 100. For example, the system configuration application 116 can be configured to optimize settings for automixer 304, establish a system gain structure and synchronize mute statuses across the audio network, and optimize other DSP blocks shown in FIG. 3.

In some embodiments, the system configuration application 116 includes an automatic configuration component or module for configuring or setting up relevant microphones, and the conferencing system 100 at large, according to recommended device configuration settings. The automatic configuration component may be configured to detect each microphone coupled to the conferencing system 100, identify a type or classification of the microphone (e.g., MXA910, MXA310, etc.) or other device information, and configure the detected microphone using pre-selected DSP parameters or settings associated with the identified microphone type. For example, each microphone may have a pre-assigned network identification (ID) and may automatically convey its network ID to the system 100 during a discovery process performed at initial set-up. The system configuration application 116 may use the network ID to retrieve DSP settings associated with the network ID from a memory (e.g., look-up table) and provide the retrieved settings to the DSP component 118, or otherwise cause the DSP component 118 to pre-populate the DSP settings that are associated with the network ID of the detected microphone. The pre-selected DSP settings may also be based on the channel to which the microphone is connected. According to embodiments, the DSP settings may include selections or default values for specific parameters, such as, e.g., parametric equalization, noise reduction, compressor, gain, and/or other DSP components shown in FIG. 3, for example. As shown in FIG. 3, an auto-configuration component 320 may be included on each microphone input line to apply the appropriate DSP settings to each microphone prior to automixing.

The system monitoring application 117 of system 100 comprises monitoring and control software designed to monitor the overall enterprise or network and individually control each device, or application, included therein. In some embodiments, the conferencing application 104 software may rely on the system monitoring application 117 to authenticate a user and authorize the user's capabilities. The system monitoring application 117 interfaces with the conferencing application 104 using a network control protocol (e.g., ACN). The overall architectural patterns employed by the conferencing application 104 can be summarized as event-driven with a standard Get-Set-Notify approach to the underlying tiers, with a sense of Model-View-Controller within the user interface (UI) itself. For example, the system monitoring application 117 can be configured to monitor the conferencing application 104, detect events, and notify users based on those events. In embodiments, the conferencing application 104 may be monitored from the system monitoring application 117 by maintaining a capability of the controller 114 to respond to discovery requests as if the conferencing application 104 is a network control device. This allows the system monitoring application 117 to monitor and control the conferencing application 104 the same way as any other hardware in the system 100. This approach also provides the shortest way to bring monitoring and control support for the conferencing application 104.

In embodiments, the computing device 102 can include one or more data storage devices configured for implementation of a persistent storage for data such as, e.g., presets, log files, user-facing events, configurations for audio interfaces, configurations for the virtual audio device driver 130, current state of the conferencing application 104, user credentials, and any data that needs to be stored and recalled by the end user. For example, the data storage devices may include event log database 122 and/or resource monitoring database 128 shown in FIG. 1. The data storage device(s) may save data in flash memory or other memory devices of the computing device 102. In some embodiments, the data storage device(s) can be implemented using, for example, SQLite data base, UnQLite, Berkeley DB, BangDB, or the like. Use of a data base for the data storage needs of the conferencing application 104 has certain advantages, including easy retrieval of data history using pagination and filtered data queries.

As shown in FIG. 1, the event log database 122 can be configured to receive event information from controller 114 and generate user-facing events based on pre-defined business rules or other settings. For example, the event log 122 can subscribe for system events and provide user-facing actionable events to help the user identify problems and have a clear understanding of what needs to be done to fix the problems. The event log database 122 may maintain a history of events that is retrievable upon request from any controller software. Pagination of history is preferred if the end user is configured to keep history for a long period of time. In some cases, when the user interface (UI) controller, such as, e.g., web-based application 113 or the system monitoring application 117, requests events to show to the end user, the controller 114 may reject this request if the conferencing application 104 is busy with the CPU or other time critical tasks.

In embodiments, event logging can be an essential part of the conferencing application 104 and an important way to troubleshoot software. Each component of the conferencing application 104 architecture can be configured to log every event that occurred in that subsystem. Logging can be easy to integrate, have low impact on each component's behavior, and follow a common format across the board. The end user can use the web browser-based application 113 (or other thin component user interface (CUI)) or the system monitoring application 117 to configure the length of time the user wants to keep log files. Usually, the time period varies from 1 month to 1 year and will be determined during specification phase of the conferencing application project.

In some cases, the event logs collected in the conferencing application 104 and stored in the event log database 122 may not be user-facing logs. Developers can analyze log files and identify the problem the end user is experiencing. In some cases, a tool for analyzing log files may be provided with many different ways to search and visualize log data. This tool allows the user to create a data set for a specific issue (e.g., JIRA number) and analyze it by creating specific queries. For example, an Easy Logging tool for logging events in the conferencing application 104 may be used. Since logs can take a lot of space on any PC, the development team can have a user driven feature to clean up old logs based on date. This tool may be used in, for example, Channel+ Shure iOS application, and can provide a very comprehensive support for logging.

The resource monitoring database 128 stores information received from a resource monitoring component or module 124 of the computing device 102. In embodiments, the resource monitor 124 may be an existing component of the computing device 102 that monitors the resources of the computing device 102 and updates the user on the health of the computing device 102. In embodiments, the DSP component 118 of the conferencing application 104 may be dependent upon certain resources of the computing device 102 such as, e.g., CPU, memory, and bandwidth, as well as the availability of other applications and services, such as the network audio library 126 and the virtual audio device driver 130. The resource monitoring component 124 may include a monitoring daemon that is used for receiving or distributing the computing device resource metrics. For example, the daemon may be configured to monitor the system in real time and submit the results to remote or local monitoring and alerting applications, allow remote checks, and resolve any problems by executing scripts. Data collected by the resource monitoring component 124 may be stored in the database 128 and provided to the controller 114, as needed. In some embodiments, based on preset thresholds, the resource monitor 124 can determine which resources may need to be stopped or be scaled back due to overuse or underuse and which resources may need tuning or re-configuration to better handle current usage. These determinations may be used to provide alerts or warnings to the user about potential resource-related issues.

Both the event log database 122 and the resource monitoring database 128 are in communication with tray application 136. Tray application 136 is a user-facing software application that may appear in the system tray (Windows OS) or menu bar (Mac OS) of the computing device 102. Tray application 136 can present event information and/or resource monitoring data to the user when using the conferencing application 104. For example, tray application 136 may alert the user of resource overuse detected by the resource monitor 124 or of new events received at the event log 122. The user may use this information to debug or otherwise correct issues as they come up.

In embodiments, tray application 136 can also enable the user to launch web browser-based application 113. The web browser-based application 113 may be a thin component user interface (CUI) or other HTML5 application configured to allow user configuration or debugging of the conferencing application 104. In some embodiments, the web-based application 113 may limit user access to only a few configurable items within the application 104. As shown in FIG. 1, the web-based application 113 may interface with the controller 114 using a Websocket-based protocol, such as, e.g., DMP-TCP, that is passed inside the Websocket payload.

In the illustrated embodiment, web-based application 113, event log database 122, resource monitoring database 128, tray application 136, and resource monitoring component 124 are stored in the computing device 102. In other embodiments, one or more of these components may be stored on a remote server or other computing device and accessed by the computing device 102.

According to embodiments, the conferencing application 104 may be distributed as a licensed software product. The exact set of licensed features, licensing model, and sales strategy may vary depending on the licensor and licensee. For example, the license may involve purchase of a predetermined number of channels (e.g., 4, 16, etc.) for use during operation of the conferencing application 104. According to embodiments, the number of channels (or lobes) provided by the DSP 118 is scalable, depending on the number of channels purchased by the license. However, the overall implementation of a licensed component within the conferencing application 104 will remain the same regardless of the number of channels.

As shown in FIG. 1, the conferencing application 104 includes a licensing component 120 that is in communication with one or more licensing server(s) 138. The licensing component 120 can be configured for validating conferencing application behavior according to the license purchased by the end user, including ensuring that only a licensed number of channels are being used to exchange or communicate audio and/or control data, or that only certain functionality or performance levels are available. In some cases, the licenses may be flexible enough to allow for various license combinations, and the licensing component 120 can be configured to aggregate or segregate the licensed number of channels in order to accommodate a given conferencing environment. For example, a conferencing project with two rooms requiring four channels each could be covered by a single license containing eight channels. The licensing server 138 can include a third-party license management tool (e.g., Flexera FLexNet Operations (FNO)) that provides entitlement management, as well as managing timing and compliance issues, enables customers to install licensed software, and otherwise handles all licensing needs for the conferencing application 104.

In embodiments, the licensing interface 204 of the controller 200, as shown in FIG. 2, may be invoked right before sending a command to the DSP 118, in order to determine whether the license will allow the desired DSP action. According to embodiments, the DSP 118 can be configured for per-channel referencing to accommodate the variable number of channels associated with each license. Limitations that are driven by the license purchased by the user can also limit the user's actions in the user interface (e.g., web-based application 113 or system monitoring application 117). A license library (not shown) may be linked into the conferencing application 104, via the licensing server 138 and/or licensing component 120, and additional code may be executed to interface with the license library to validate license capabilities. The validation of a given license can happen on a timer (e.g., every 24 hours) to assure that license is still valid.

According to a preferred embodiment, the conferencing application 104 starts automatically without user login and runs under Windows OS as a service, with the controller 200 and DSP 118 components being parts of a single executable program. Deployment of the conferencing application 104 includes installing the controller 200 and DSP component 118 as a system service under Windows. The installation can configure the service to start automatically. The installer for the conferencing application 104 may have the ability to package and install on any desired platform; provide capability to invoke installations for third-party components (such as, e.g., the network audio library 126 and controller therefor, webserver, etc.), and/or gather and install required re-distributable/dependencies or required Windows updates; provide access to system resources, such as, e.g., available NICS or network audio library 126; and have flexible user interfaces (UIs) to walk the end user through and provide comprehensive feedback thereto during the installation process.

One example installer may be InstallAnywhere, which is an installation development solution for application producers who need to deliver a professional and consistent multiplatform installation experience for physical, virtual and cloud environments. InstallAnywhere can create reliable installations for on-premises platforms—Windows, Linux, Apple, Solaris, AIX, HP-UX, and IBM—and enables the user to take existing and new software products to a virtual and cloud infrastructure, and create Docker containers—all from a single InstallAnywhere project.

Another exemplary installer is InstallBuilder, which can create installers for all currently supported versions of Windows, Mac OS X, Linux and all major Unix operating system. It also supports a large number of older and legacy platforms to maximize backwards compatibility of the setup process, as needed.

In some embodiments, the conferencing application 104 can be implemented across multiple rooms with a centralized monitoring system (e.g., the system monitoring application 117) being used to gather monitoring data from each of the rooms and to provide a holistic view of resource performance measurements. For example, a single conferencing environment may be made up of multiple rooms interconnected with each other via audio and/or video feeds over a network connection. In such cases, each room may have access to, or be controlled by, the conferencing application 104, and the conferencing application 104 may present itself as any other networked system device being monitored by the system monitoring application 117 of the conferencing system 100. In embodiments, the multi-room configuration for the conferencing application 104 can be highly scalable to accommodate any number of rooms.

Various components of the conferencing system 100, and/or the subsystems included therein, may be implemented using software executable by one or more computers, such as a computing device with a processor and memory (e.g., as shown in FIG. 4), and/or by hardware (e.g., discrete logic circuits, application specific integrated circuits (ASIC), programmable gate arrays (PGA), field programmable gate arrays (FPGA), etc.). For example, some or all components may use discrete circuitry devices and/or use a processor (e.g., audio processor and/or digital signal processor) executing program code stored in a memory, the program code being configured to carry out one or more processes or operations described herein. In embodiments, all or portions of the processes may be performed by one or more processors and/or other processing devices (e.g., analog to digital converters, encryption chips, etc.) within or external to the computing device 102. In addition, one or more other types of components (e.g., memory, input and/or output devices, transmitters, receivers, buffers, drivers, discrete components, logic circuits, etc.) may also be utilized in conjunction with the processors and/or other processing components to perform any, some, or all of the operations described herein. For example, program code stored in a memory of the system 100 may be executed by an audio processor in order to carry out one or more operations shown in FIG. 3.

According to embodiments, the computing device 102 may be a smartphone, tablet, laptop, desktop computer, small-form-factor (SFF) computer, smart device, or any other computing device that may be communicatively coupled to one or more microphones and one or more speakers in a given conferencing environment. In some examples, the computing device 102 may be stationary, such as a desktop computer, and may be communicatively coupled to microphone(s) and/or speakers that are separate from the computer (e.g., a standalone microphone and/or speaker, a microphone and/or speaker of a conferencing device, etc.). In other examples, the computing device 102 may be mobile or non-stationary, such as a smartphone, tablet, or laptop. In both cases, the computing device 102 may also include a native microphone device and/or a native speaker device.

FIG. 4 illustrates a simplified block diagram of an exemplary computing device 400 of the conferencing system 100. In embodiments, one or more computing devices like computing device 400 may be included in the conferencing system 100 and/or may constitute the computing device 102. Computing device 400 may be configured for performing a variety of functions or acts, such as those described in this disclosure (and shown in the accompanying drawings).

The computing device 400 may include various components, including for example, a processor 402, memory 404, user interface 406, communication interface 408, native speaker device 410, and native microphone device 412, all communicatively coupled by system bus, network, or other connection mechanism 414. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device 400 may be physically remote (e.g., a standalone microphone) and may be communicatively coupled to the computing device, via the communication interface 408, for example.

Processor 402 may include a general purpose processor (e.g., a microprocessor) and/or a special purpose processor (e.g., a digital signal processor (DSP)). Processor 402 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 404 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 404 includes multiple kinds of memory, particularly volatile memory and non-volatile memory.

The memory 404 may be computer readable media on which one or more sets of instructions, such as the software for operating the methods of the present disclosure and/or the conferencing application 104, can be embedded. The instructions may embody one or more of the methods or logic as described herein. As an example, the instructions can reside completely, or at least partially, within any one or more of the memory 404, the computer readable medium, and/or within the processor 402 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

User interface 406 may facilitate interaction with a user of the device. As such, user interface 406 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 406 may also comprise devices that communicate with inputs or outputs, such as a short-range transceiver (RFID, Bluetooth, etc.), a telephonic interface, a cellular communication port, a router, or other types of network communication equipment. The user interface 406 may be internal to the computing device 400, or may be external and connected wirelessly or via connection cable, such as through a universal serial bus port.

Communication interface 408 may be configured to allow the device 400 to communicate with one or more devices (or systems) according to one or more protocols. In one example, the communication interface 408 may be a wired interface, such as an Ethernet interface or a high-definition serial-digital-interface (HD-SDI). As another example, the communication interface 408 may be a wireless interface, such as a cellular, Bluetooth, or WI-FI interface.

In some examples, communication interface 408 may enable the computing device 400 to transmit and receive information to/from one or more microphones and/or speakers located in the conferencing environment (e.g., conferencing device 106 shown in FIG. 1). This can include lobe or pick-up pattern information, position information, orientation information, commands to adjust one or more characteristics of the microphone, and more.

Data bus 414 may include one or more wires, traces, or other mechanisms for communicatively coupling the processor 402, memory 404, user interface 406, communication interface 408, native speaker 410, native microphone 412, and/or any other applicable computing device component.

In embodiments, the memory 404 stores one or more software programs for implementing or operating all or parts of the conferencing platform described herein, the conferencing system 100, the conferencing application 104, and/or methods or processes associated therewith, including, for example, process 300 shown in FIG. 3. According to one aspect, a computer-implemented method of audio processing for a conferencing environment, such as, e.g., the conferencing system 100 shown in FIG. 1, can be implemented using one or more computing devices 400 and can include all or portions of the operations represented by process 300 of FIG. 3. Said method comprises receiving input audio signals at a plurality of audio sources, wherein the receiving includes receiving far-end input audio signals (such as, e.g., VADD input 316 shown in FIG. 3) at a virtual audio device driver (such as, e.g., VADD 130 shown in FIG. 1) from a conferencing software module (such as, e.g., third-party conferencing software 108 shown in FIG. 1), and receiving near-end input audio signals (such as, e.g., network mic inputs 302 shown in FIG. 3) at a network audio library (such as, e.g., network audio library 126 shown in FIG. 1) from one or more near-end audio devices (such as, e.g., conferencing device 106 shown in FIG. 1). The method further comprises processing the input audio signals using a digital signal processing component (such as, e.g., DSP component 118 shown in FIG. 1). The processing includes applying acoustic echo cancellation techniques (e.g., as shown by AEC/NR 307 shown in FIG. 3) to one or more of the near-end input audio signals, and generating audio output signals (such as, e.g., network line outputs 310 and/or VADD output 318 shown in FIG. 3) based on the input audio signals.

According to some aspects, the processing of the input audio signals by the DSP component also comprises mixing two or more of the near-end input audio signals to generate an automix output signal (e.g., as shown by automixer 304 in FIG. 3). According to more aspects, the generating of the audio output signals by the DSP component includes using a matrix mixer (such as, e.g., matrix mixer 306 in FIG. 3) to generate the audio output signals. According to one aspect, for a given audio source, the matrix mixer may be configured to mix the automix output signal generated by the automixer and/or one or more of the near-end input audio signals with one or more of the far-end input audio signals, while also excluding any input audio signals received from the given audio source.

In some embodiments, the plurality of audio sources further includes one or more native audio devices, such as, e.g., a native microphone and/or speaker of the computing device 400, or more specifically, a device driver configured to communicatively couple the native audio device(s) to the computing device 102 (e.g., native audio I/O driver 110). In such cases, the input audio signals may further include native input audio signals (such as, e.g., native input 312 shown in FIG. 3), and the output audio signals may further include native output audio signals (such as, e.g., native output 314 shown in FIG. 3). The native audio devices may be considered near-end audio sources, as they capture and/or broadcast audio around or adjacent to the computing device 400.

According to some aspects, the processing of the input audio signals by the DSP component further includes providing pre-selected audio processing parameters to the digital signal processing component for at least one of the near-end audio devices, and applying the pre-selected parameters to the corresponding near-end input audio signal (e.g., as shown by auto-config 320 in FIG. 3). According to one aspect, the processing of the input audio signals by the DSP component further includes identifying device information associated with the at least one near-end audio device; and retrieving one or more pre-selected audio processing parameters from a memory for said near-end audio device based on the identified device information.

According to some aspects, the processing of the input audio signals by the DSP component further includes decrypting one or more input audio signals (e.g., as shown by decryption module 321 in FIG. 3), and encrypting one or more audio output signals (e.g., as shown by encryption module 322 in FIG. 3). According to one aspect, the near-end audio signals received at the network audio library may be encrypted (e.g., by the conferencing device 106 itself), and thus, require decryption prior to processing. In such cases, the audio output signals generated for the network audio library may be encrypted prior to transmission.

According to some aspects, the method further includes determining a number of channels available to the digital signal processing component for receiving the near-end input audio signals based on one or more licenses associated with the conferencing environment (e.g., as shown by licensing module 120 in FIG. 1). According to more aspects, the method further comprises collecting usage information for computing resources in use by the platform (e.g., as shown by resource monitoring database 128 in FIG. 1), generating one or more alerts based thereon (e.g., as shown by resource monitoring module 124 in FIG. 1), and providing said alerts to a user interface (e.g., web-based application 113 and/or tray application 126 shown in FIG. 1) for presentation to a user. According to still more aspects, the method further comprises synchronizing a mute status of a given audio source across all other audio sources in the conferencing environment (e.g., as shown by mute logic 134 in FIG. 1). According to some aspects, the processing of the input audio signals by the DSP component includes synchronizing the received input audio signals to a single clock (e.g., as shown by clock sync module 131 in FIG. 1).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A software-based conferencing platform at least partially operating on a server of a cloud computing network, the server communicatively coupled to a local computing device, the software-based conferencing platform comprising:
   a plurality of audio sources configured to provide input audio signals, the input audio signals comprising far-end input audio signals from a conferencing software module included in the local computing device, and near-end input audio signals from one or more near-end audio devices communicatively coupled to the local computing device; and
   a system configuration component configured to:
      obtain device information for each near-end audio device of the one or more near-end audio devices;
      for each near-end audio device of the one or more near-end audio devices, retrieve, from a memory, one or more audio processing parameters associated with corresponding device information for the near-end audio device; and provide the one or more audio processing parameters to a digital signal processing component to automatically configure corresponding settings of the digital signal processing component based thereon.

2. The software-based conferencing platform of claim 1, further comprising:
a controller module located at least partially on the server of the cloud computing network and configured to interface with the system configuration component, the plurality of audio sources, and a digital signal processing component, wherein the controller module is configured to control one or more near-end audio devices located external to the local computing device.

3. The software-based conferencing platform of claim 1, further comprising a mute logic module configured to:
receive a mute request from a given audio source, the mute request comprising a mute command or an unmute command; and
provide the mute request to the digital signal processing component to synchronize a mute status of the given audio source across all other audio sources in the software-based conferencing platform based on the mute request.

4. The software-based conferencing platform of claim 1, further comprising the digital signal processing component, wherein the digital signal processing component is configured to:
generate processed near-end audio signals by applying the one or more audio processing parameters associated with each near-end audio device to the input audio signals received from that near-end audio device, thereby automatically configuring the corresponding settings of the digital signal processing component; and
generate audio output signals based on the far-end input audio signals and the processed near-end input audio signals.

5. The software-based conferencing platform of claim 4, wherein the digital signal processing component comprises an automixing module configured to mix or more of the processed near-end input audio signals to generate an automix output signal, and the system configuration component is further configured to optimize one or more settings of the automixing module.

6. The software-based conferencing platform of claim 4, wherein the digital signal processing component comprises a matrix mixing module configured to generate the audio output signals.

7. The software-based conferencing platform of claim 4, wherein the digital signal processing component comprises a clock synchronization module configured to synchronize the input audio signals to a single clock.

8. The software-based conferencing platform of claim 1, wherein the plurality of audio sources comprises a virtual audio source configured to receive the far-end input audio signals from the conferencing software module and appear as an echo-cancelling speakerphone to the conferencing software module.

9. The software-based conferencing platform of claim 1, wherein the system configuration component is configured to obtain the device information from each of the one or more near-end audio devices during a device discovery process, the one or more near-end audio devices configured to automatically transmit the device information to the local computing device during the device discovery process.

10. The software-based conferencing platform of claim 1, wherein at least a portion of the software-based conferencing platform operates on the local computing device.

11. The software-based conferencing platform of claim 1, wherein the system configuration component is further configured to transmit, to each near-end audio device of the one or more near-end audio devices, audio pick-up pattern information for an audio lobe assigned to the near-end audio device for receiving the near-end input audio signals captured by that near-end audio device, the audio lobe corresponding to one of a plurality of channels at the digital signal processing component.

12. A computer-implemented method of audio processing for a conferencing environment using a server of a cloud computing network and a local computing device communicatively coupled to the server, the computer-implemented method comprising:
receiving input audio signals from a plurality of audio sources, the input audio signals comprising far-end input audio signals from a conferencing software module included in the local computing device, and near-end input audio signals from one or more near-end audio devices communicatively coupled to the local computing device;
obtaining, using a system configuration component, device information for each near-end audio device of the one or more near-end audio devices;
for each near-end audio device of the one or more near-end audio devices, retrieving, from a memory, one or more audio processing parameters associated with corresponding device information of the near-end audio device; and
providing the one or more audio processing parameters to a digital signal processing component to automatically configure corresponding settings of the digital signal processing component based thereon.

13. The computer-implemented method of claim 12, further comprising:
generating processed near-end input audio signals by applying, using the digital signal processing component, the one or more audio processing parameters associated with each near-end audio device to the input audio signals received from that near-end audio device, thereby automatically configuring the corresponding settings of the digital signal processing component; and
generating audio output signals based on the far-end input audio signals and the processed near-end input audio signals.

14. The computer-implemented method of claim 13, further comprising:
mixing, using an automixing module included in the digital signal processing component, two or more of the processed near-end input audio signals to generate an automix output signal, and
optimizing, using the system configuration component, one or more settings of the automixing module.

15. The computer-implemented method of claim 13, further comprising generating the audio output signals using a matrix mixing module of the digital signal processing component.

16. The computer-implemented method of claim 13, further comprising:
transmitting, to each near-end audio device of the one or more near-end audio devices, using the system configuration component, audio pick-up pattern information for an audio lobe assigned to the near-end audio device for receiving the near-end input audio signals captured by that near-end audio device, the audio lobe corresponding to one of a plurality of channels at the digital signal processing component.

17. The computer-implemented method of claim 13, further comprising:
synchronizing the input audio signals to a single clock using a clock synchronization module included in the digital signal processing component.

18. The computer-implemented method of claim 12, wherein the plurality of audio sources comprises a virtual audio source for receiving the far-end input audio signals from the conferencing software module, the virtual audio source appearing as an echo-cancelling speakerphone to the conferencing software module.

19. The computer-implemented method of claim 12, further comprising:
obtaining, using the system configuration component, the device information from each of the one or more near-end audio devices during a device discovery process, the one or more near-end audio devices automatically transmitting the device information to the local computing device during the device discovery process.

20. The computer-implemented method of claim 12, further comprising:
receiving a mute request from a given audio source, the mute request comprising a mute command or an unmute command; and
providing the mute request to the digital signal processing component to synchronize a mute status of the given audio source across all other audio sources in a software-based conferencing platform, at least partially operating on the server, based on the mute request.

\* \* \* \* \*